May 4, 1926.
T. H. HANLEY
1,583,458
NAIL KNOB ASSEMBLING MACHINE
Filed Dec. 12, 1921
9 Sheets-Sheet 3
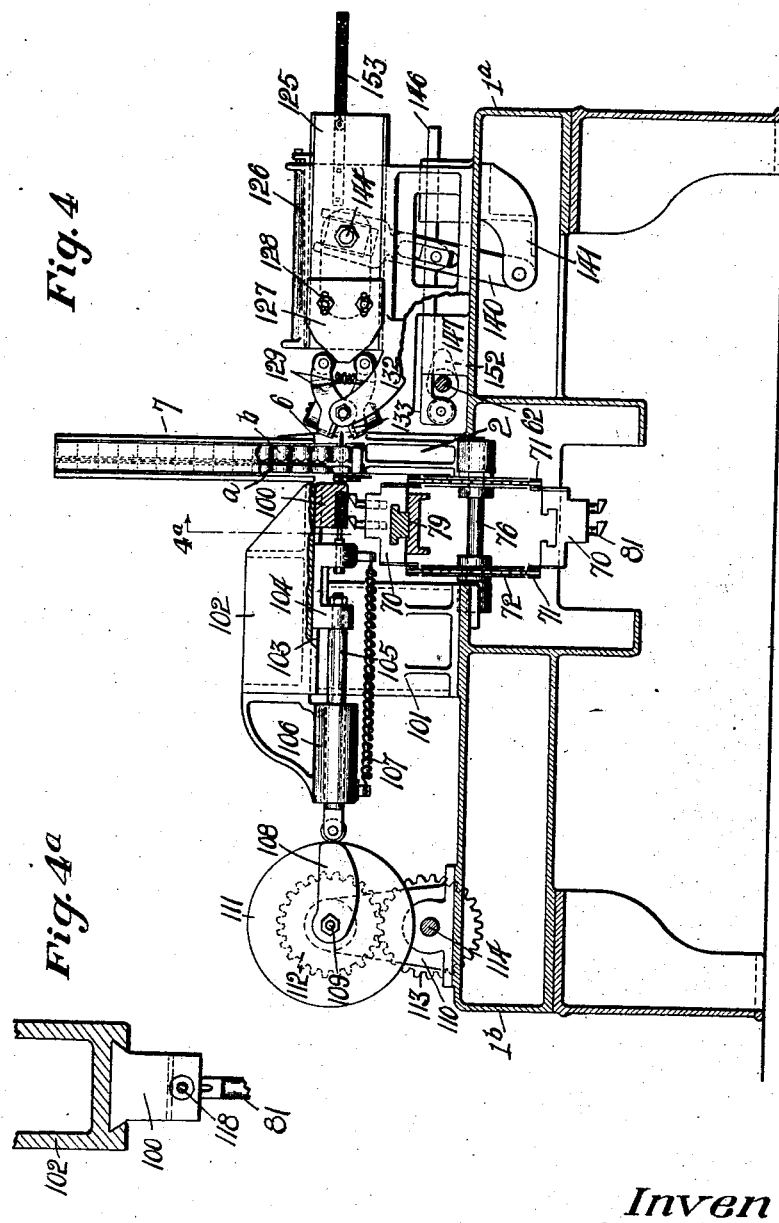
Inventor
Timothy H. Hanley,
By Owen Owen & Cranston
Attys.

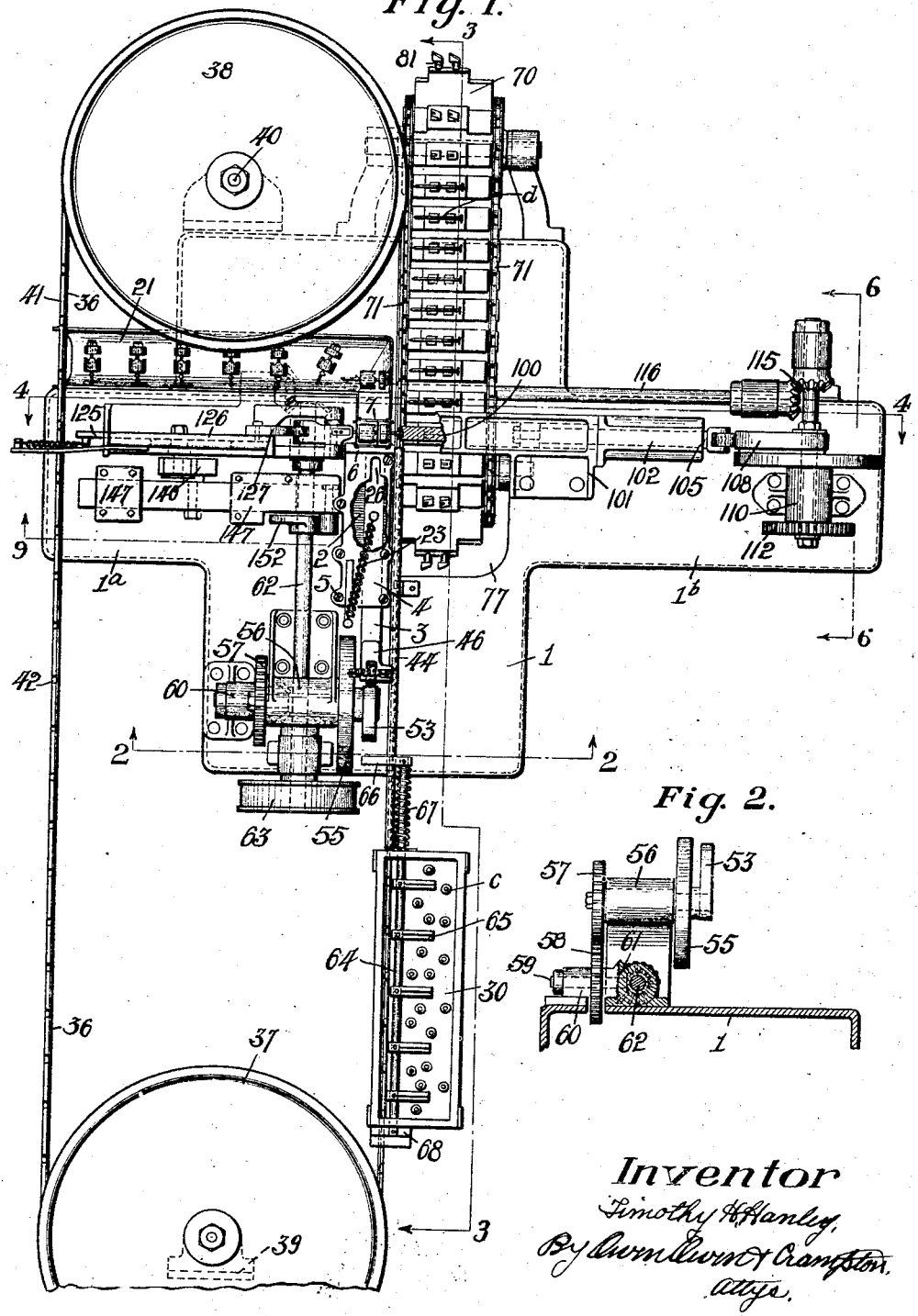

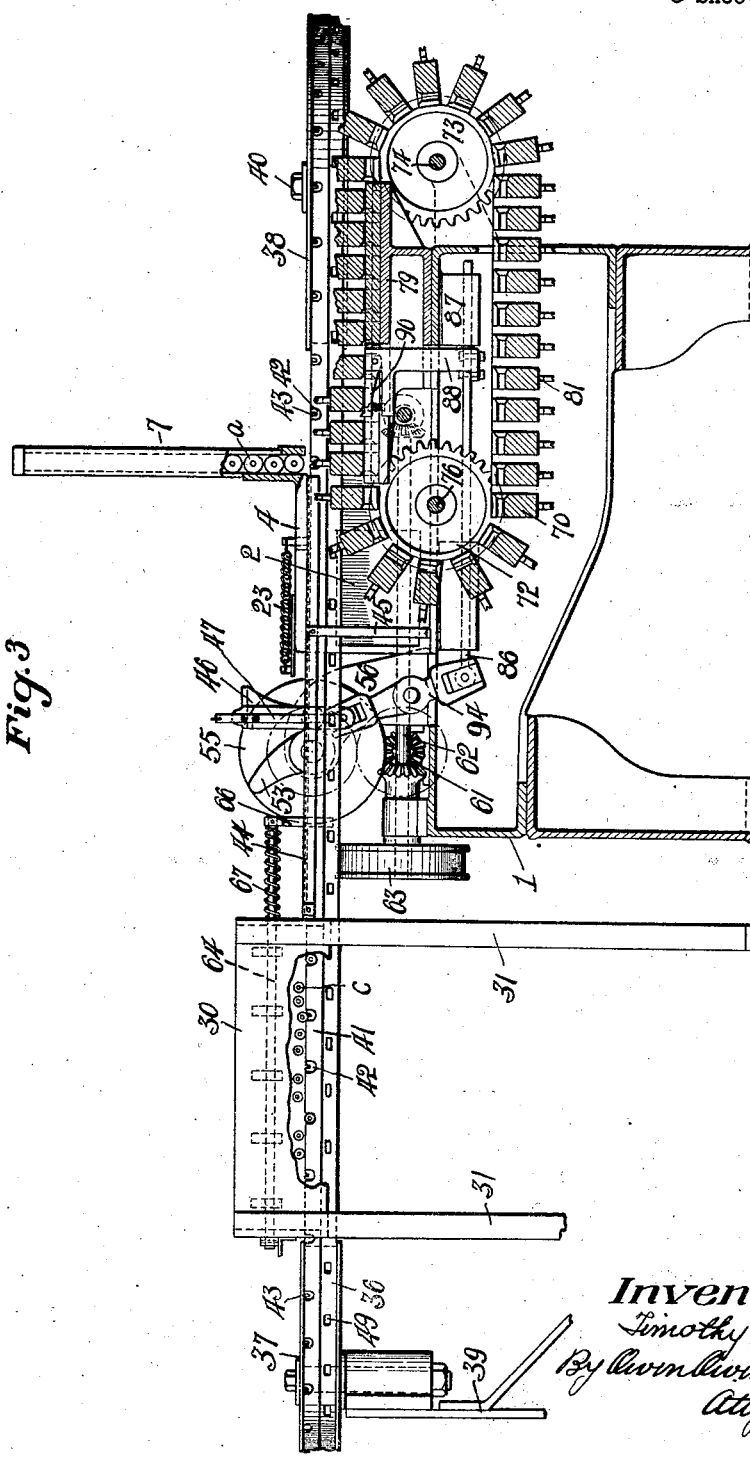

May 4, 1926.
T. H. HANLEY
1,583,458
NAIL KNOB ASSEMBLING MACHINE
Filed Dec. 12, 1921
9 Sheets-Sheet 4
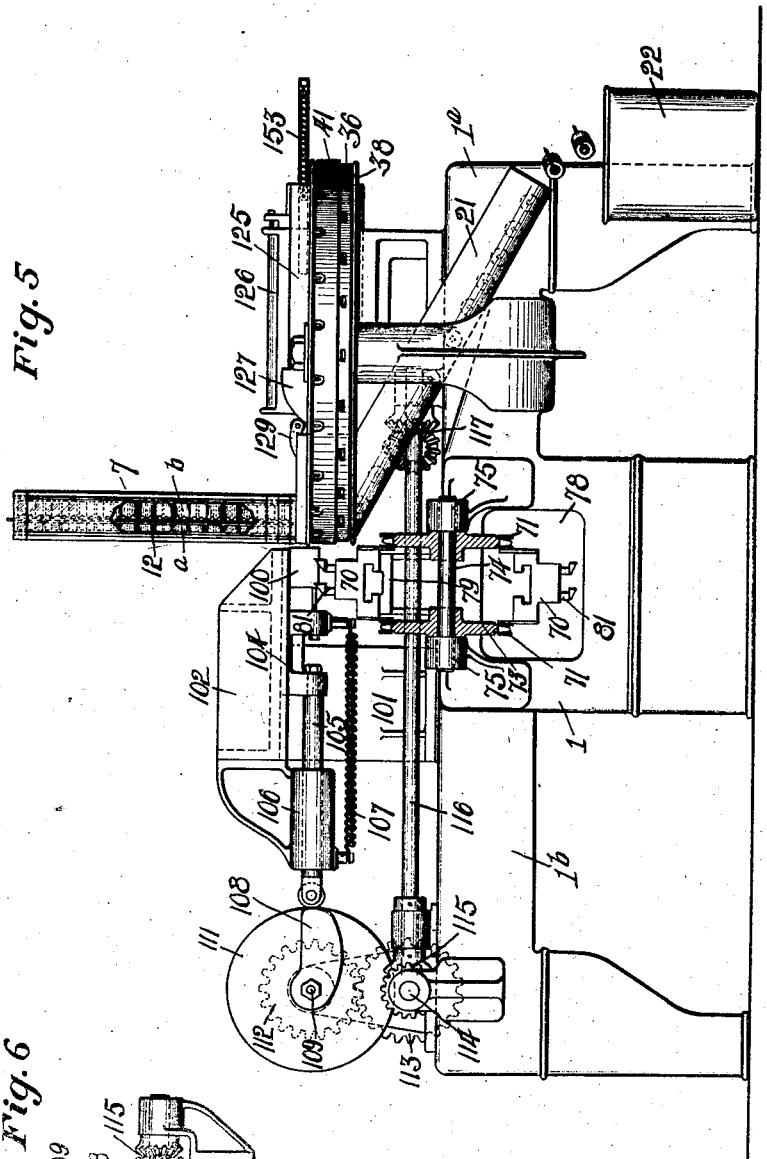

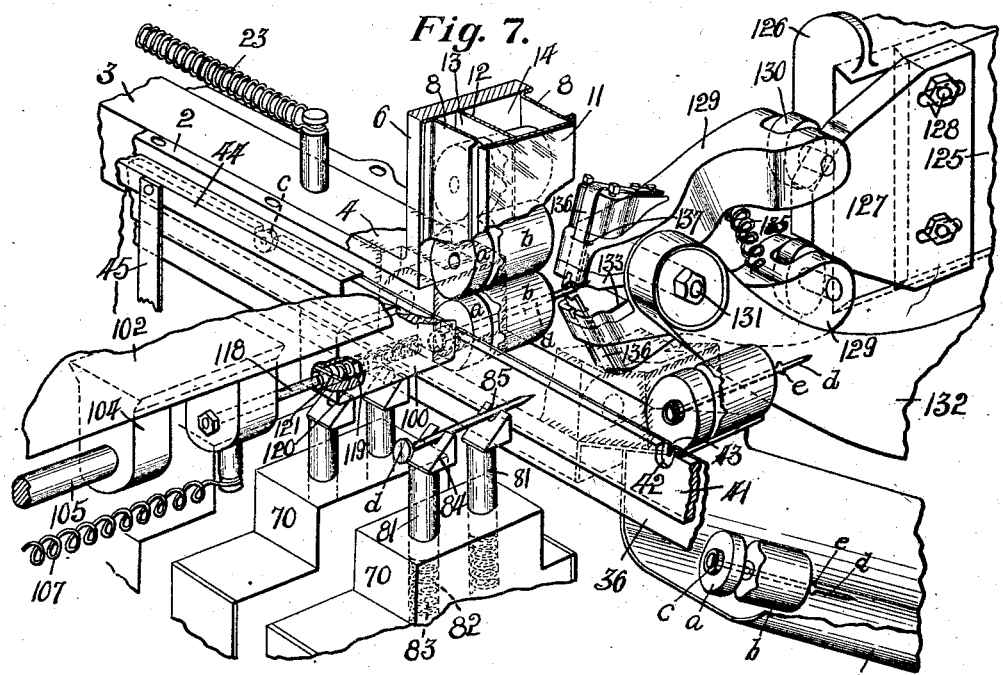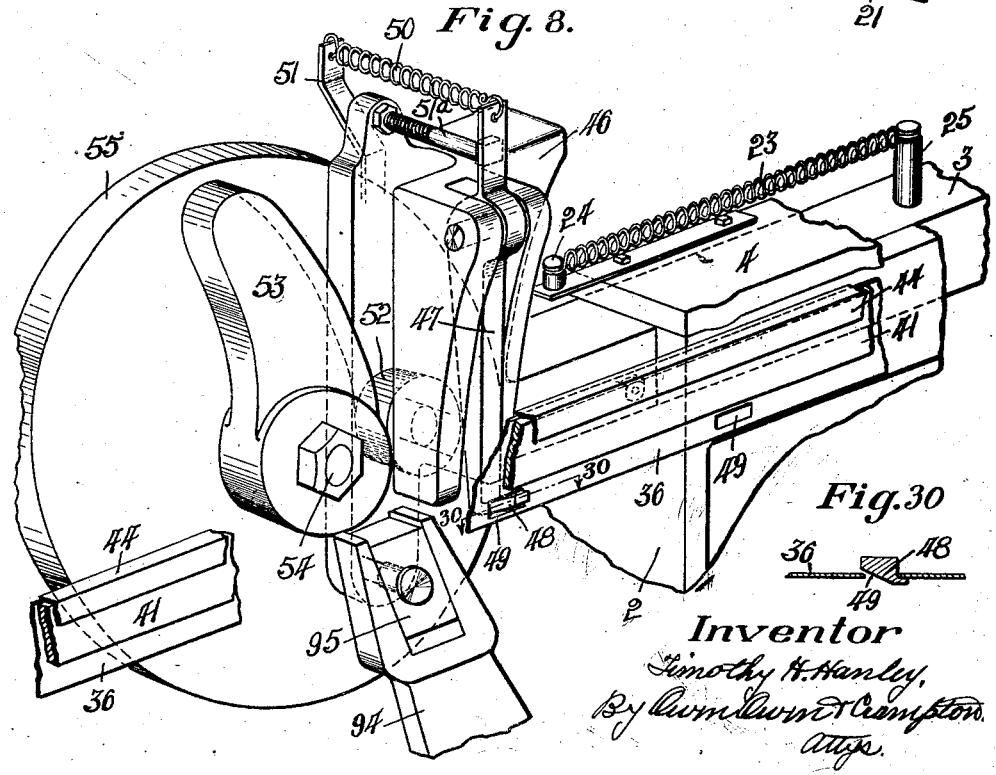

May 4, 1926.
T. H. HANLEY
NAIL KNOB ASSEMBLING MACHINE
Filed Dec. 12, 1921
1,583,458
9 Sheets-Sheet 6
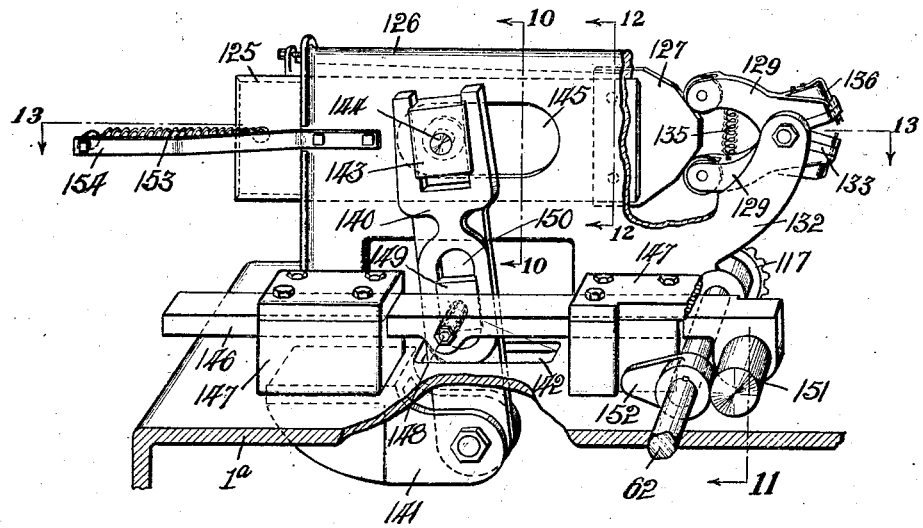

May 4, 1926.
T. H. HANLEY
1,583,458
NAIL KNOB ASSEMBLING MACHINE
Filed Dec. 12, 1921
9 Sheets-Sheet 7
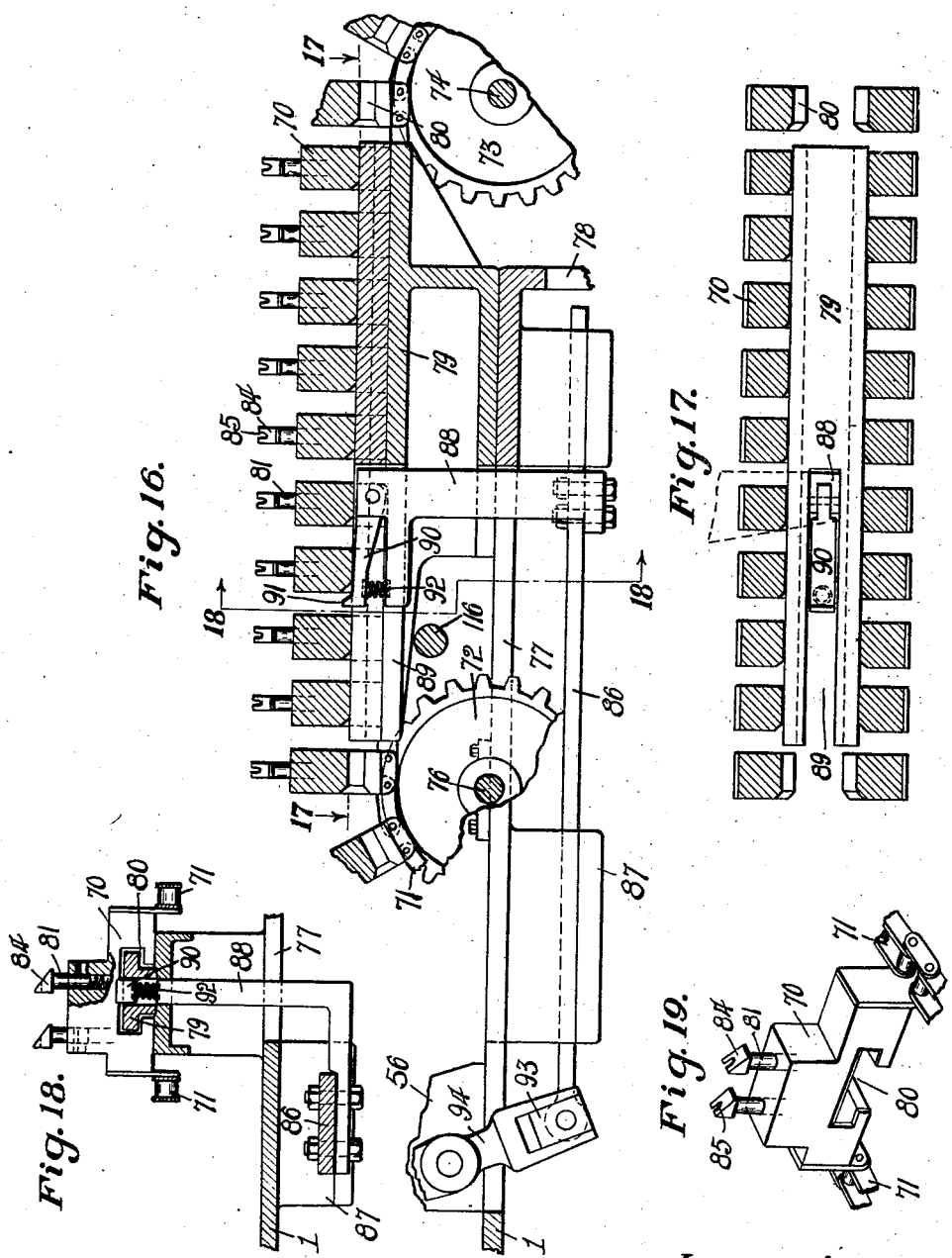
Inventor
Timothy H. Hanley,
By Owen Owen & Crampton.
Attys.

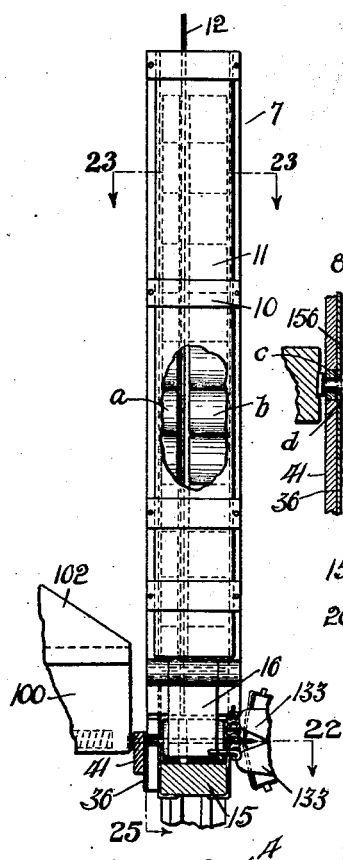
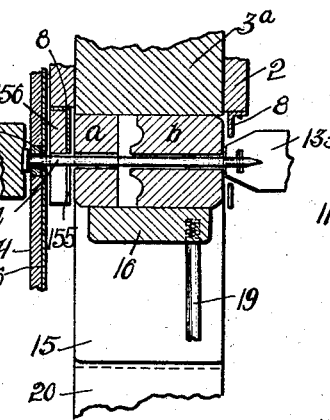
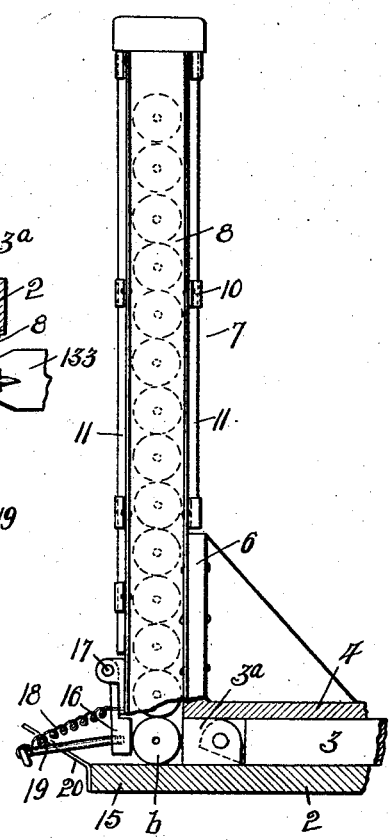
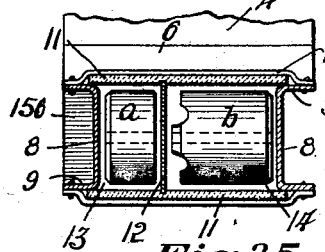
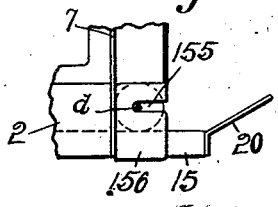
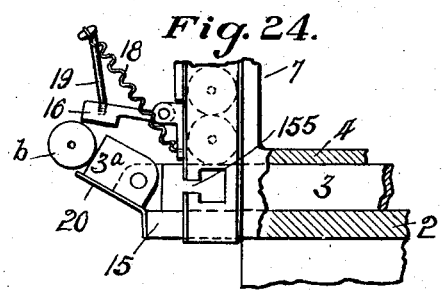

May 4, 1926.
T. H. HANLEY
NAIL KNOB ASSEMBLING MACHINE
Filed Dec. 12, 1921
1,583,458
9 Sheets-Sheet 9
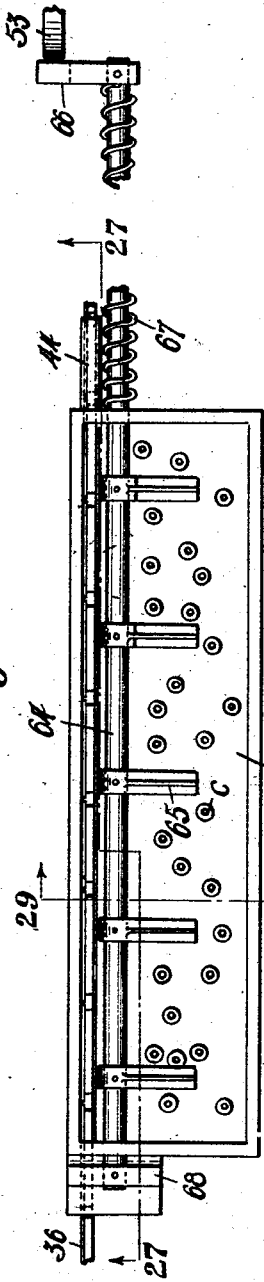
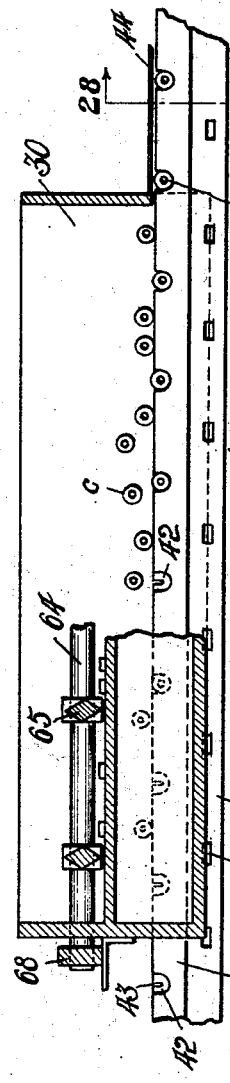
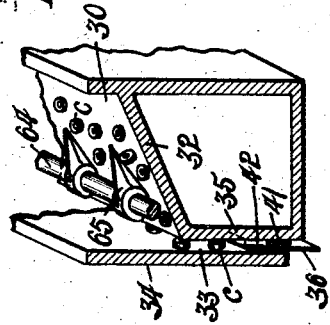
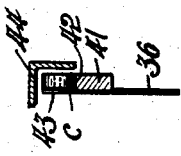
Inventor
Timothy H. Hanley,
By Crum Owen & Crampton,
Attys.

Patented May 4, 1926.

1,583,458

UNITED STATES PATENT OFFICE.

TIMOTHY HENRY HANLEY, OF CINCINNATI, OHIO, ASSIGNOR TO THE FEDERAL PORCELAIN COMPANY, OF CAREY, OHIO, A CORPORATION OF OHIO.

NAIL-KNOB-ASSEMBLING MACHINE.

Application filed December 12, 1921. Serial No. 521,772.

*To all whom it may concern:*

Be it known that I, TIMOTHY HENRY HANLEY, a citizen of the United States, and a resident of Cincinnati, in the county of Hamilton and State of Ohio, have made an Invention Appertaining to a Nail-Knob-Assembling Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a machine for assembling the parts of nail knobs used in connection with electric wiring and commonly comprising a pair of porcelain base and cap members, a nail threaded through axial apertures in the members and projecting therebeyond for driving into a support, and a washer mounted on the nail between its head and the cap member, as well understood in the art.

The primary object of my invention is the provision of a simple and compact machine of the character described which is automatically operable in a rapid and efficient manner to successively feed nails, washers and insulating members to assembling position with all in axial alignment, then threading the nail successively through the washer, cap and base members, then to upset a portion of the nail shank to form an enlargement thereon to prevent its withdrawal from the members, and then to eject the assembled parts as a unit from the machine preparatory to assembling the parts of another unit, such operations being automatically repeated so long as the machine continues to operate.

A further object of the invention is the provision of simple and efficient means for forming a burr or enlargement on a nail shank by pinching the same between upsetting dies and for centering the nail with respect to the dies before upsetting so that such operation will be uniform for all nails.

Further objects of the invention reside in the separate means for successively feeding the nails, washers and knobs or insulating members to assembling position and feeding the nails through the washers and knob members whereby each of the several means operates in a rapid, efficient and economical manner.

The invention is fully described in the following specification, and while, in its broader aspect it is capable of embodiment in numerous forms, a preferred embodiment thereof is illustrated in the accompanying drawings, in which,—

Fig. 1 is a top plan view of the machine with parts broken away. Fig. 2 is a section on the line 2—2 in Fig. 1. Fig. 3 is a section on the line 3—3 in Fig. 1. Fig. 4 is a section on the line 4—4 in Fig. 1. Fig. 4ª is a section on the line 4ª in Fig. 4. Fig. 5 is a front end elevation of the machine with a part in section. Fig. 6 is a section on the line 6—6 in Fig. 1. Fig. 7 is an enlarged fragmentary perspective view of the assembling and nail upsetting parts with a nail threaded through a washer and a pair of knob members and in the act of being engaged by the upsetting means. Fig. 8 is an enlarged fragmentary perspective view of a portion of the washer carrying belt and nail carrying and indexing means together with a part of the assembled knob ejecting means. Fig. 9 is an enlarged fragmentary rear perspective view of the nail upsetting means with parts broken away. Figs. 10, 11, 12 and 13 are sections, respectively, on the lines 10—10, 11, 12—12 and 13—13 in Fig. 9. Fig. 14 is an enlarged perspective fragmentary view of the gripping ends of the nail upsetting jaws in upsetting engagement with a nail. Fig. 15 is a central vertical fragmentary section thereof. Fig. 16 is an enlarged fragmentary central, longitudinal, vertical section through the nail carrying and indexing means. Figs. 17 and 18 are sections respectively, on the lines 17—17 and 18—18 in Fig. 16. Fig. 19 is a fragmentary perspective view of the nail carrying chains with an attached nail carrying block. Fig. 20 is an enlarged front elevation of the knob member holding magazine, with parts broken away and with a fragmentary portion of the associated nail upsetting means. Fig. 21 is a side elevation of the magazine with parts broken away. Fig. 22 is an enlarged section on the line 22 in Fig. 20. Fig. 23 is an enlarged section on the line 23—23 in Fig. 20. Fig. 24 is a side elevation of the base portion of the magazine with a part broken away similar to Fig. 21 and with the ejecting plunger in its advanced position. Fig. 25 is a view on the line 25 in Fig. 20. Fig. 26 is a top plan view of the washer supply feeding and agitating means with parts broken away. Fig. 27 is a section thereof on the line 27 in Fig. 26. Fig. 28 is a section on the line 28—28 in Fig. 27. Fig. 29 is a section on the line 29—29 in Fig. 26, and Fig. 30 is a section on the line 30—30 in Fig. 8.

The machine embodying the invention, in its general construction, comprises (1) means, in the present instance, in the form of a gravity feed magazine, for successively feeding pairs of knob insulating members to assembling position with their axially disposed apertures in alignment; (2) means for intermittently feeding washers to assembling position with the aperture of each washer, when in such position, in axial register with the apertures through a pair of insulating members; (3) means for intermittently feeding nails into longitudinal alignment with the apertures through a washer and the insulating members which are disposed in assembling position and then forcing a positioned nail through such apertures until its head substantially coacts with the washer member; (4) means for upsetting the outer end portion of the nail to form burrs thereon to prevent a withdrawal of the nail from the washer and insulating members, and (5) means for ejecting an assembled nail knob from assembling position and from the machine.

Referring to the drawings, 1 designates a machine frame having the opposite side extensions 1ª and 1ᵇ. A standard 2 rises from the top of the frame 1 between the side extensions thereof and forms at its top a guide groove, which extends lengthwise of the frame and is grooved to guide the movements of an ejector ram 3, the operation and purpose of which will be hereinafter described. The guide groove is closed at its top by a cover plate 4, removably secured to the standard by screws 5 and having its forward end provided with an upright arm or extension 6.

A magazine 7 for the cap and base members $a$ and $b$, respectively, of an insulating knob, is secured at its lower end portion to the forward side of the upright arm 6 of the cover plate 4. This magazine comprises opposing vertically elongated side strips 8 of metal or other suitable stiff material having the outwardly turned edge flanges 9, two of which are rigidly bolted, riveted or otherwise suitably secured to the forward side of the cover upright 6 (Fig. 23). The strips 8 at the rear side of the magazine above the upright 6 and at the forward side thereof are tied together at suitable intervals by vertically spaced cross-pieces 10, which are preferably bowed outward to permit the insertion of transparent side strips 11, such for instance as celluloid, at the inner sides thereof with the edges of the strips lapping the respective edges of the side strips 8 and clamped thereto by the cross-pieces 10.

The interior of the magazine is divided by a vertical partition member 12 into two chutes or compartments 13 and 14 for respectively receiving the nail knob members $a$ and $b$. Each compartment 13 and 14 is of suitable size to permit a single column of the respective knob members to be disposed therein for free gravity feeding movements therethrough with the axes of pairs of knob members in aligned position. The upper end of the magazine is open to permit the introduction of knob members therein and its lower end is closed by a forwardly extending shelf 15 on the standard 2 which shelf extends in advance of the forward end of the guide groove in such standard. The front side of the magazine 7 terminates a distance above the shelf slightly greater than the diameter of the nail knob members to permit the free forward ejection of a pair of such members from the magazine through the opening thus provided. This opening is normally closed by a gate 16, hinged at its upper end to the front side of the magazine above the opening, as at 17 (Fig. 21), and adapted to have a forward an upward opening movement. The gate is normally held in closed position by a coiled contractile spring 18, which connects the forward lower end portion of the magazine to the outer end of a pin 19 projecting forward from the lower end portion of the gate.

The ejector-ram 3 is normally held in retracted position with its forward end disposed substantially flush with the rear vertical interior wall of the magazine 7 (as shown in Fig. 21), and in depth and width is substantially equal, respectively, to the diameter and combined lengths of a pair of knob members $a$, $b$. On a forward ejecting movement of the ram 3 it forces the lowermost pair of members $a$, $b$ forward from the magazine through the bottom front opening thereof and causes a raising of the gate 16 by reason of the pressure of the knob members thereagainst. The knob members then pass up an inclined nose 20 at the forward end of the lip or shelf 15 and are discharged over the edge thereof, in the present instance, into an inclined trough 21 by which they are directed to a receiving receptacle 22 (Fig. 5). The ram 3 passes under and is intended to support the remaining knob members in the two columns during the ejecting operation and until the ram has returned to its normal position, when the knob members are permitted to lower by gravity to place a succeeding pair thereof in assembling position at the base of the magazine. To facilitate the discharging of the knob members over the inclined nose 20 the ram is provided with a pivoted nose portion 3ª, which is vertically movable with respect to the ram to adapt it to pass up the incline. The ram 3 is normally held in retracted position by a coiled contractile spring 23, which is anchored at its rear end to a pin 24 on the cover plate and at its forward end to a pin 25 that projects upward from the ram 3 through a longitudinal slot 26 in the cover plate 4.

The washer members c are contained in a hopper or supply box 30 disposed at the rear end of the machine and supported, in the present instance, by legs or standards 31. The bottom 32 of the hopper is inclined and terminates at its lower edge in a narrow slot or recess 33 of slightly greater thickness than a washer, but not sufficently thick to permit a washer to pass downward therein in other than substantially upright position. The side 34 of the hopper extends at its lower edge down beyond the lower end of the bottom 32 and cooperates with a wall 35 to form the trough or space 33. The lower portion of the space 33 is open at its ends and bottom to permit the passage of a washer feed belt 36 therethrough.

The belt 36 is of endless form and passes around guide wheels 37 and 38 disposed respectively at the rear and forward ends of the machine, the wheel 37 being mounted on the upper end of a bearing standard 39 and the wheel 38 being mounted on a bearing stud 40 secured to and rising from the forward end of the frame 1. The wheels 37 and 38 are disposed in the horizontal plane of the ram 3 and are disposed so that one flight of the belt passes along the right hand side of the standard 2 and the base portion of the magazine 7 in close relation thereto. The belt 36 is provided on its outer face at or near its top edge with a flexible strip 41 of leather or other suitable material and of a width substantially equal to the width of the washer c. The upper edge of the belt strip 41 is provided in equidistantly spaced relation throughout its length with washer carrying notches 42, each being of a suitable size to carry only one washer in upright position. The belt 36 which closes the inner end of each pocket is provided in its upper edge with a notch 43 in register with each pocket to permit an assembling nail d to pass through a washer and the belt strip 36 and then to be raised from engagement with the belt as an assembled knob passes up the incline 20 upon being ejected from the magazine.

During a passage of the washer feed belt 36 through the feed hopper 30, the washers which have passed down into the slot or recess 33 with their axes in horizontal position transverse to the belt, will drop into the belt carrying pockets 42, one washer for each pocket, the length of the recess 33 being sufficient to insure a washer dropping into a belt recess 42 before it has passed entirely through the recess. The belt passes from the forward end of the hopper 30 under a guard strip 44 of L-form which laps the top of the belt and extends downward at the outer side therof in closing relation to the outer ends of the pockets 42 so as to cooperate with the belt 36 to retain the washers c in the pockets until each washer has been transferred to assembling position at a side of the base portion of the magazine 7. For this purpose the guard strip 44 extends from the forward end of the hopper 30 to the magazine 7 and along the side of the standard 2. The strip 44 at its rear end is secured to the hopper 30 and near its forward portion is supported by a support 45 rising from the base portion of the standard 2.

The feed belt 36 is intended to have successive indexing movements of equal length imparted thereto with the length of each belt movement equal to the space between centers of successive washer carrying pockets 42, and each rest or dwell position of the belt being so timed that the opening of a washer which has been moved into assembling position at a side of the magazine 7 will stand in axial register with the openings through the lowermost set of insulating members a, b in the magazine.

The indexing means for the feed belt 36 is combined with the means for imparting ejecting movements to the ram 3, and is best illustrated in Figs. 1, 2, 3 and 8. The rear end of the ram 3 is provided with an upstanding bracket arm 46, which carries a catch lever 47 at its outer side for pivotal movements transverse to the ram. The lower end of the lever 47 extends down to adjacent the lower edge of the feed-belt 36, and is provided on its outer side with a catch-lug 48 for engaging in successive slots or openings 49 in the lower edge portion of the belt during successive forward ejecting strokes of the ram. The catch lug 48 is hooked at its forward end and inclined at its rear end, as best shown in Figs. 8 and 30, to adapt it to have a positive forward feeding action on the belt when disposed in a notch 49 and the ram is moved forward, and to pass out of a notch and slide rearward along the belt during a retracting movement of the ram. The slots or openings 49 are suitably spaced so that each indexing movement of the belt will be equal to the distance between the centers of adjoining washer receiving notches 42. The upper end of the catch lever 47 is connected by a coiled contractile spring 50 to an anchoring post 51 on the arm 46 and acts to normally force the catch end of the lever into catch engagement with an opening 49 when in register therewith. The upper end of the catch lever 47 engages a stop pin 51ᵃ to limit its belt engaging movement.

A roller 52 is carried by the arm 46 at its rear side and is engaged by a wiper-cam 53 at each revolution thereof to impart a positive forward feeding movement to the ram 3 and a consequent feeding movement to the belt 36. The wiper-cam 53 is mounted on a shaft 54 with a fly or balance wheel 55, said shaft being journaled transverse to the frame 1 in a bearing bracket 56 rising from the top of the rear end portion thereof (Figs. 1 and 2). The shaft 54 carries a spur-gear 57 in mesh with a spur-gear 58 on a counter-shaft 59 journaled in a bearing 60 on the frame 1, said counter-shaft having a bevel gear connection 61 with a drive shaft 62 journaled longitudinally of the frame in bearings provided thereon. The rear end of the shaft 62 carries a belt-wheel 61 to enable it to be connected to a suitable source of power.

A rod 64 is mounted in the bottom portion of the hopper 30 adjacent to the recess 33 thereof for longitudinal reciprocatory movements therein, and has arms 65 projecting laterally therefrom and adapted to effect an agitation of the washers in the hopper when the rod is reciprocated, this insuring a feeding of the washers into the belt receiving recess 33. The rod 64 projects at its forward end a distance beyond the hopper 30 and carries a laterally projecting arm 66 at such end in position to be engaged by the wiper cam 53 at a predetermined point in each revolution thereof, which causes a rearward movement to be imparted to the rod. The rod is normally held in its forward position by a coiled compression spring 67, which is mounted thereon with its opposite end-thrusts against the adjacent hopper end and the arm 66. The forward movements of the agitator rod 64 are limited by the coaction with the rear end of the hopper 30 of a suitable block 68 fixed to the rod.

The means for successively feeding nails $d$ to assembling position at a side of the hopper 7 without the washer feed belt 36 and for forcing each nail when in assembling position through the registering openings of a washer $c$ and the cap and base members $a$ and $b$ of the insulator will now be described, reference being had particularly to Figs. 1, 3, 4, 5, 6, 7, 16, 17, 18 and 19. The nail feeding means comprises a plurality of blocks 70 which are disposed between and carried in equidistantly spaced relation by transversely spaced sprocket chains 71, each of which chains is guided for movement by a pair of front and rear sprocket wheels 72 and 73. The front sprocket-wheels 73 are mounted on a cross-shaft 74 journaled for free turning movements in bearing arms 75 projecting from the forward end of the frame 1, and the rear wheels 72 are mounted on a cross-shaft 76 extending cross-wise of a top opening 77 in the frame 1 and loosely journaled at its ends in suitable bearings at the sides of said opening. The sprocket wheels 72 are disposed in the frame opening 77 (Fig. 16) so that the feed-chain, comprising the members 70 and 71, is adapted to feed through said opening with the lower flight thereof passing through a forward end opening 78 (Fig. 5) in the frame.

The feed-chain blocks 70, during the upper flight of movement thereof, are firmly supported for true horizontal movement by a bearing standard 79, which rises from the top of the frame 1 intermediate the sprocket-wheels 72 and 73 and has its top of T-form in cross section (Figs. 5 and 18) and substantially spanning the space between the front and rear sprocket wheels. The blocks 70 are provided at their inner sides with T-shaped grooves 80 complemental to the T-portion of the standard 79 and adapted, as they leave the forward set of wheels 73, to interengage and remain in engagement with the standard until the blocks arrive substantially over the center of the rear set of wheels 72. The sprocket-wheels 72 and 73 and the block guiding and supporting standard 79 are so disposed with respect to the magazine 7 that the standard 79 extends from a point at the rear of the magazine forward a distance in advance thereof. The movement of the upper flight of the feed chain is rearward along the guide standard and the blocks 70 are firmly supported for true horizontal movement thereby until they have passed the vertical plane of the magazine.

Each block 70 is provided on its top, in spaced relation transversely of the feed chain, with two nail supporting pins 81, which are mounted at their lower ends in respective sockets 82 in the top or outer side of each block 70 (Fig. 18) and are yieldingly supported in such sockets by coiled compression springs 83 mounted in the base portions of the sockets. The upper end of each pin 81 is provided with a head 84 provided on its top with a notch 85 for receiving a nail $d$, the nail being intended to rest in horizontal position transverse to the feed chain in the notches of the two pins 81 of a block, with the head of the nail disposed at the side of the feed chain remote from the magazine. The outer side of each pin head 84 is tapered to cause the supporting pins to be depressed by the nail head when it is forced across the same by the means hereinafter described. The travel of the pins 81 of the upper chain flight is disposed at the outer side of the washer carrying flight of the washer feeding belt 36, in close relation thereto, and the nails *d* carried by the pins are disposed in the horizontal plane of the axes of the washers *c* carried by the belt 36. The feed-chain 70, 71 is intended to have a step by step movement to successively move the blocks 70 to nail knob assembling position with the nail *d* carried thereby in axial register with the apertures through the lowermost pair of nail knob members *a*, *b* in the magazine 7 and with the apertures through the washer *c* which has been moved into axial register with the nail knob members.

The indexing means for the feed-chain 70, 71 includes a slide bar 86 mounted for longitudinal sliding movements in guides 87 on the under side of the frame top (Fig. 16), the slide bar having an arm 88 projecting upward therefrom through the frame top opening 77 and into a slot 89 provided in the forward end portion of the guide standard 79. A dog 90 is pivoted at its end to the upper end of the arm 88 for vertical rocking movements and has its rear end provided with a catch nose 91 for engagement with the forward side of each block 70 to impart a rearward feeding movement to the block at each rearward stroke of the dog. The dog 90 has its free end supported by a spring 92 to cause it to normally engage the blocks, and the forward end of the nose 91 thereof is beveled to prevent it, when moved forward, from having catch engagement with the blocks. The bar 86 pivotally carries a slide block 93 at its rear end disposed within the lower forked end of a lever 94 which is pivoted to the bearing standard 56 and has its upper end forked and receiving a slide block 95 (Fig. 8) pivotally carried at the lower end of the ejector ram arm 46. It is evident that upon a forward ejecting movement of the ram 3 the lever 94 will be operated to impart a predetermined rearward block feeding movement to the dog 90, and the catch dog 47 on the rear end of the ejector ram will simultaneously act on the washer feed belt 36 to move it forward a predetermined extent. The length of movements of the washer feed belt 36 and nail feeding chain 70, 71 are so regulated that a washer *c* and a nail *d* will each be brought into axial register with each other and with the lowermost pair of insulating members *a*, *b* in the magazine 7 at each ejecting stroke of the ram 3.

When a nail *d* has been moved into assembling position a nail driving plunger 100 which stands at the outer end of the nail in longitudinal alignment therewith is moved forward and forces the nail from supporting pins 81 through the registering washer *c* and insulating knob members *a* and *b* and is then retracted from the path of feeding movements of the nails to permit a succeeding nail to be fed to assembling position by the next indexing movement of the feed chain 70, 71. A standard 101 rises from the top of the frame 1 and inner end portion of the frame extension 1ᵇ at the outer side of the frame top opening 77 and has a forwardly overhanging head portion 102 extending outward from near the adjacent side of the magazine 7 and provided in its under side with a guide groove 103 from which the plunger 100 is suspended for reciprocatory movements transverse to the machine. The plunger 100 is connected to a slide block 104 mounted in the groove 103 at the outer end of the plunger and having a tappet-rod 105 projecting outward therefrom through a bearing 106 at the outer end of the head 102. The plunger 100 is normally held in retracted position by a coiled contractile spring 107, which connects the slide block 104 to the bearing 106.

Properly timed forward feeding movements are periodically imparted to the tappet-rod 105 and connected plunger by a wiper-cam 108 carried by a shaft 109 extending longitudinally of the machine, the wiper-cam engaging a roller on the outer end of the tappet-rod. The shaft 109 is journaled in a bearing 110 rising from the frame extension 1ᵇ and carries a balance or fly wheel 111 and a spurgear 112, the spurgear meshing with a gear 113 on a shaft 114 journaled in the base portion of said bearing. The shaft 114 has bevel gear connection 115 with a shaft 116 suitably journaled transversely of the machine frame and being in beveled gear connection 117 at its opposite end with the forward end of the drive shaft 62.

It is preferable to provide a cushioned connection between the plunger 100 and slideblock 104 so that the plunger may stand still during a forward nail driving stroke of the slide block should the nail strike an obstruction or offer an abnormal resistance to the driving action, thereby preventing breakage of the parts. To provide such cushioned connection the slide block 104 has a stem 118 (Fig. 7) projecting forward therefrom and entering a socket 119 in the adjacent end of the plunger between the base of which socket and the plunger is disposed a compression spring 120. The spring 120 is of suitable tension to cause the plunger to move forward with the slide block except when a predetermined resistance is offered to such movement. If desired, the stem 118 may be keyed to the block 104 by a soft shear-pin 121 which will shear and permit a relative movement of the plunger and slide block when a predetermined resistance is encountered by the plunger during a forward movement thereof.

The mechanism for upsetting or forming burrs *e* on a nail shank to prevent its withdrawal from the knob members after being inserted therethrough is mounted on the left hand side portion of the frame 1 and on its extension 1ª and includes a slide 125, which is mounted in a bearing standard 126 for horizontal reciprocatory movements transverse to the frame or toward and away from the base portion of the magazine 7. A camplate or nose 127 is secured to the slide 125, preferably for longitudinal adjustment relative thereto, by slot and bolt connection 128 and has its outer end, relative to the plate, of V-cam form to adapt it to enter between and cause a relative outward movement of the adjacent ends of a pair of nail upsetting or burr-forming jaw levers 129, each of which is provided with a roller 130 for coaction with the respective edge of the cam nose 127. The jaw levers 129 are pivotally carried intermediate their ends for relative rocking movements by a pivot pin 131 projecting from an arm 132 of the standard 126, and the outer ends of the levers 129 are disposed in adjacent relation to the base portion of the magazine 7 in position for the pointed end of a nail $d$ to enter a distance therebetween when it has been forced the maximum extent through a pair of knob members $a$, $b$ and a washer $c$, as best shown in Figs. 4 and 7. The inner faces of the nail gripping ends of the levers are provided with suitable dies 133 having transversely aligned notches 134 in their outer end portions (Figs. 7, 14 and 15), which partially receive the registering portion of a nail so that the edge walls of the notches squeeze out registering side portions of the nail to form the burrs thereon. A coiled contractile spring 135 connects the inner end portions of the jaw levers 129 and acts to normally retain the jaws in open position and the inner ends of the levers in contact with the respective cam edges of the slide nose 127.

It is important to center a nail with respect to the burr-forming notches 134 of the upsetting jaws so that the burrs will be uniformly formed on each nail. This is accomplished by extending one end of an angled or L spring finger 136 through an opening 137 in the outer end of each jaw transversely thereof and in the direction of closing movement of the jaw, with the free ends of the fingers normally projecting inwardly beyond the nail gripping faces of the jaws and in lapping relation to each other, each finger being provided with a V-centering notch at its free end between which a nail shank is gripped and centered with respect to the upsetting notches 134 upon a closing movement of the jaws. The opposite or inner ends of the spring fingers 136 extend toward the inner ends of the levers 129 and are fixed at their ends to the levers in spaced relation to the elbows of the fingers so as to permit yielding longitudinal movements of the free end portions of the fingers upon a closing of the jaws.

An operating lever 140 for the lever jaw operating slide 125 is fulcrumed at its lower end to a bearing bracket 141 at the under side of the top of the frame extension 1ª (Fig. 9) and extends upward from such bearing through an opening 142 on the frame top at the rear side of the bearing standard 126. The upper end of the lever 140 is in forked engagement with a slide block 143 carried by a pin 144 projecting from the slide 125 through an opening 145 in the bearing standard 126. A bar 146 is mounted for reciprocatory movements transversely of the machine frame in adjacent relation to the rear side of the lever 140 in bearings 147 on the frame extension top 1ª. A pivot pin 148 projects from the bar 146 and carries at its forward end a block 149, which is mounted for longitudinal sliding movements in a guide slot 150 provided in the lever 140 intermediate its ends. It is thus evident that a reciprocation of the bar 146 will impart rocking movements to the lever 140 and reciprocatory movements to the slide 125. The bar 146 at its inner end extends across the drive shaft 62 and carries a stud or roller 151 at such end in position to be engaged by a wiper cam 152 on the shaft 62. The wiper cam 152 at each revolution imparts a positive stroke to the bar 146 in a direction to communicate a lever jaw closing stroke to the slide 125. The rear stroke of the slide 125 and of the operating parts connected thereto is actuated by a coiled contractile spring 153, which connects the outer end of the slide 125 to an arm 154 projecting from the outer end of the bearing standard 126.

To permit the feeding or forcing of a nail $d$ through the base portion of the magazine 7 during a threading of the nail through a washer $c$ and insulating members $a$ and $b$, and also to permit the forward ejection from the magazine of a nail and knob parts through which it has been threaded, the magazine sides 8 are provided at their base portions with horizontally disposed transversely extending slots or notches 155 which are open at their forward ends and disposed in proper position for a nail to pass therethrough during a threading operation. In the present instance, the slot or notch 155 at the far side of the magazine is vertically enlarged at its inner end portion. The channel of the side bar 8 disposed adjacent to the washer feeding belt 36 is filled at the inner side of such belt by a block 156 which is notched to correspond to the associated notch 155 of the magazine.

During the operation of the machine it will be understood that a supply of washers $c$ is maintained in the hopper 30 and a supply of insulating knob members *a* and *b* is maintained in the magazine 7, the insulating cap members *a* being disposed in superposed relation in the compartment 13 of the magazine, and the insulating base members *b* being disposed in superposed relation in the compartment 14 of the magazine. It will also be understood that the gravity feed of the members *a* and *b* in the magazine causes the lowermost pair of such members to be disposed in assembling position within the base portion of the magazine when the ejector ram 3 is in retracted position. During a forward ejecting movement of the ram 3 the catch nose 48 of the lever 47, which is carried by the rear end of the ram 3 engages a registering opening 49 in the washer feeding belt 36 and moves such belt forward a distance sufficient to place a washer *c*, which is carried by a pocket 42 of the belt strip 41, into assembling position at a side of the magazine 7. During the same ejecting movement of the ram 3 the lever 94 is rocked to actuate the indexing means for the nail feeding chain 70, 71 and to move a block 70 of such chain into position to place a nail *d* carried thereby in assembling position at a side of the magazine 7 and in axial register with the opening through the simultaneous positioned washer *c*. Upon the retraction of the ram 3 the indexing members for the washer and nail are returned to starting position without moving either feed means and when the ram has been completely withdrawn from the magazine 7 the lowermost pair of insulating members *a* and *b* in the magazine will drop into assembling position with their apertures in register with each other and with the previously positioned washer and nail. The ram, and the indexing mechanisms actuated thereby, now remain at rest until the wiper cam 53, which actuates the movement of the ram, has passed through a predetermined portion of its revolution and has again moved into actuating engagement with the roller 52 on the ram. During such idling period of the wiper cam 53 the wiper cam 108, mounted at the outer end of the frame extension 1ᵇ, will act on the tappet rod 105 and force it, together with the connected plunger 100, inward to force or thread the previously positioned nail *d* through the apertures in the aligned washer *c* and insulating members *a* and *b* and through the notches 155 in the magazine sides with the pointed end of the nail projecting into the space between the jaws of the upsetting levers 129. Immediately after a threading movement of the nail, and while the wiper cam 53 is still idling, the wiper cam 152 on the drive shaft 62 acts on the slide bar 146 to force it inward and communicate an inward stroke to the slide 125 through the medium of the lever 140. The inward stroke of the slide 125 causes a forcing of its nose cam 127 between the inner ends of the jaw levers 129 and to impart a closing or nail upsetting movement to the jaws, thereby forming a burr *e* on each side of the nail and at the outer end of the insulating member *b* to prevent a withdrawal of the nail from such member. Upon a closing movement of the nail upsetting jaws the nail will be first engaged by the V-notched ends of the opposed gripping fingers 136 and centered thereby with respect to the upsetting notches 134 of the jaws, such fingers then moving outward as the closing movement of the jaws continue, due to the spring or yielding mounting of the fingers. When the slide 125 has completed its lever jaw operating movement it is permitted to immediately retract and the lever jaws are opened by the action of the spring 135. The wiper cam 53 then engages the ram roller 52 and imparts a forward movement to the ram to eject an assembled knob unit from the magazine through the discharge opening in the front side thereof, the gate 16 which closes such opening being forced outward by the ejecting movement of the knob unit. The continued ejecting movement of the ram forces the assembled knob unit up the incline 20, thereby effecting a raising of the nail *d* and washer *c* of the unit out of a belt pocket 42, as shown by the elevated position of the forward assembled knob unit in Fig. 7. The ejected knob unit falls from the incline 20 into the chute 21 and passes down the chute to a receiving receptacle 22. It will be understood that simultaneously with an assembled knob unit ejecting movement of the ram 3, the washer carrying belt 36 is moved forward with the discharging unit, at a uniform speed therewith, to prevent a binding of an assembled washer and nail in the belt pocket, and also to place a succeeding washer *c*, which is carried by the belt, in assembling position, and the nail feeding means is operable to position a succeeding nail in assembling position. At each revolution of the wiper cam 53 it engages the arm 66 on the washer agitating rod 64 and moves such rod with its agitating fingers 65 rearward against the tension of the spring 67. Upon a releasing of the arm 66 by the wiper cam the spring 67 will impart a quick forward movement to the rod, thereby effecting an agitation of the washers in the hopper 30 so as to insure a feeding of the same into the recess 33 and thence into a pocket 42 in the feed belt. The nails *d* are intended to be placed by hand on the supports 81 of the feed chains 70, 71 as the blocks 70 of the chain pass along the guiding standard 79 and before they have reached assembling position.

It is evident that I have provided a nail knob assembling machine which is entirely automatic in its action, except for maintaining a supply of washers in the hopper 30 and a supply of knob members *a* and *b* in the magazine 7 and for placing the nails *d* on the supports 81 of the nail feeding means. It is also evident that this machine is operable in an exceedingly rapid and efficient manner to assemble the different members of a nail knob, to form a burr or burrs on the nail shank of an assembled unit, and to accurately center the nail with respect to the burr forming means before the burr forming operation.

I wish it understood that my invention is not limited to any specific construction, arrangement or form of the parts of the entire machine or of any sub-combination thereof, as the machine as a whole and its sub-combinations, are capable of numerous modifications and changes without departing from the spirit of the claims.

Having thus described my invention, what I claim as new and desire to secure by Letters Patent, is,—

1. In a machine of the class described, an endless belt disposed with an edge thereof in upright position and having equidistantly spaced washer carrying pockets in its upper edge throughout its length, means for guiding the movement of the belt, and means operable to periodically move the belt to successively place the washers carried thereby to a predetermined position.

2. In a machine of the class described, an endless washer feed belt having an upstanding edge with a plurality of equidistantly spaced washer carrying pockets therein, means guiding the movement of the belt, means operable to act on the belt to intermittently impart movements thereto to successively place washers carried thereby in a predetermined position, and means for automatically supplying washers to the belt pockets.

3. In a machine of the class described, an article supply hopper, an endless feed belt passing through the hopper and having article carrying pockets in an edge thereof arranged in successive equidistantly spaced relation and adapted to receive articles during a passage of the belt through the hopper, means guiding the movement of the belt, and means operable to periodically move the belt to successively place articles carried thereby in a predetermined position.

4. In a machine of the class described, an article supply source, a belt having an upstanding edge with upwardly opening article carrying pockets in successive equidistantly spaced relation therein and movable through the source of article supply to have an article deposited in each pocket, means guiding the movement of the belt, and means operable to periodically move the belt to successively move articles carried thereby into a predetermined position and then to permit the belt to have a predetermined dwell.

5. In a machine of the class described, an endless belt having successively arranged equidistantly spaced pockets in the upper edge thereof, means guiding the movements of the belt, an article supply hopper having a narrow passage through a bottom portion thereof into which articles in the hopper are directed and through which the belt passes whereby the articles drop in the pockets thereof, and means operable to periodically move the belt to successively place articles carried thereby in a predetermined position.

6. In a machine of the class described, an ejecting ram for assembled articles, a movable member for carrying a plurality of articles in successive order, means operable to periodically impart ejecting movements to the ram, and means automatically operable during an ejecting movement of the ram to impart movement to the member to place a succeeding article carried thereby in assembling position.

7. In a machine of the class described, an endless article feeding belt having successive equidistantly spaced article carrying pockets therein, means guiding the movements of the belt, a reciprocatory element movable lengthwise of the belt, and means operable by a reciprocation of the element to periodically move the belt in one direction to successively place articles carried thereby in a predetermined position.

8. In a machine of the class described, means operable to eject assembled articles from assembling position, an endless belt having successive equidistantly spaced article carrying pockets therein, means operable to periodically impart ejecting movements to the ejecting means, and means carried by the ejecting means and having a catch means for engaging the belt during each ejecting movement of the ejecting means to place a succeeding article carrying pocket in assembling position.

9. In a machine of the class described, means operable to successively guide apertured nail knob members to assembling position, and means, including a feed belt, operable to successively feed a different apertured nail knob member to assembling position with its aperture in axial register with the aperture of a member guided to assembling position by the first means.

10. In a machine of the class described, means for successively guiding apertured nail knob members to assembling position, an endless belt having successive equidistantly spaced pockets for carrying a plurality of other apertured nail knob members, means guiding the movements of the belt past the assembling position of said first means, and means operable to periodically move the belt to successively place members carried thereby in assembling position at a side of the first means.

11. In a machine of the class described, a magazine for the successive gravity feed of apertured nail knob members to assembling position, a feed belt having successive pockets therein for carrying different apertured knob members and means operable to periodically move the belt to place successive members carried thereby in assembling position at a side of the magazine.

12. In a machine of the class described, gravity feed means for successively guiding the movements of nail knob members to a portion thereof wherein assembling occurs, said means having a transverse opening through the assembling portion thereof, a gate normally closing the outer side of such opening, a ram movable through the opening to open the gate and eject a member from assembling position in the means and to support the other members in the means until the ram has returned to retracted position, and means operable to periodically reciprocate the ram.

13. In a machine of the class described, an endless nail feeding chain having successive block units with nail supporting standards projecting outward therefrom to carry nails in reclining position, means guiding the movements of the chain to give it a prolonged upper horizontal flight portion, and means operable to impart predetermined intermittent movements to the chain to successively move nails carried thereby to a predetermined position, and means for acting on each nail when in predetermined position to eject it lengthwise from the respective supporting standard.

14. In a machine of the class described, a magazine for containing a plurality of pairs of apertured nail knob members for successively feeding by gravity to assembling position, with the apertures of the members of each pair in axial alignment, and means operable to periodically feed successive nails into position to be threaded through the successive pairs of nail knob members when in assembling position.

15. In a machine of the class described, means for guiding the gravity movements of successive pairs of apertured knob members to assembling position with the apertures of the members of each pair in alignment, an endless nail feeding means operable to move successive nails carried thereby into assembling relation to a pair of members disposed in assembling position, and means automatically operable to impart periodical step-by-step movements to the nail feeding means to move a nail into aligned relation to each pair of members when in assembling position.

16. In a machine of the class described, an endless chain having successive blocks and yielding nail supporting means carried by each block, means guiding and supporting the movement of the chain and the upper flight thereof, and means automatically operable to periodically move the chain to successively advance nails carried thereby to a predetermined position.

17. In a machine of the class described, movable means operable to carry and periodically move nails successively to assembling position, means for guiding successive apertured knob members to assembled position, and means automatically operable to act on each nail when in assembling position to discharge it from the carrying means and thread it through an aligned knob member.

18. In a machine of the class described, movable means operable to carry a plurality of nails transverse to its line of movement and to successively and periodically place the nails in assembling position, means for guiding the gravity movements of knob members to assembling position, and means automatically operable to act on each nail when in assembling position to discharge it from the carrying means transversely thereof and thread it through an aligned knob member.

19. In a machine of the class described, an endless movable means having a plurality of successively arranged blocks and nail supporting members yieldingly carried by each block, means guiding the movements of the nail carrying means to successively and periodically move the nails carried thereby to assembling position, and means including a plunger operable to cause the plunger to act on each nail when in assembling position to discharge the nail from the carrying means transversely thereof and thread it through an aligning member, the nail carrying members of the carrying means yielding as the plunger passes thereover.

20. In a machine of the class described, movable means operable to carry and periodically move nails successively to assembling position, and means automatically operable to act on each nail when in assembling position to discharge it from the carrying means and thread it through an aligned member, and having a part which yields when a nail offers a predetermined resistance to a threading movement thereof.

21. In a machine of the class described, means for periodically and successively feeding apertured members to assembling position, means for periodically and successively feeding nails to assembling position in alignment with the aperture through a member which has been moved to assembling position, and automatically operable means having a yieldable thrust bar for acting on each nail when in assembling position to thread it through the aperture of a registering member.

22. In a machine of the class described, means for carrying apertured members and moving them to assembling position, endless chain means for carrying nails and moving them to assembling position, mechanism operable to periodically move each of said members and nail carrying means to successively place apertured members and nails in aligned relation, and means operable to act on a nail to force it through a registering member when in aligned relation therewith.

23. In a machine of the class described, an endless belt for carrying and successively moving washers to assembling position, means for carrying and successively moving nails to assembling position in register with a positioned washer, mechanism for imparting predetermined periodical movements to the belt, and means for intermittently operating said belt to periodically place washers and nails in aligned assembling relation, and means operable to act on each nail when in assembling position to force it through an aligned washer.

24. In a machine of the class described, an endless washer carrying belt movable to successively place washers carried thereby in assembling position, an endless nail carrying means movable to successively place nails carried thereby in assembling position with respect to a positioned washer, mechanism operable to periodically impart predetermined washer and nail placing movements respectively to said belt and means, and means automatically operable on a nail when in assembling position to thread it through a washer disposed in assembling position.

25. In a machine of the class described, means for successively guiding the gravity movements of a plurality of knob members to assembling position, separate means operable to respectively carry and move washers and nails to assembling position, and means operable to act on a nail member when in assembling position and thread it through a washer and knob member disposed in assembling position.

26. In a machine of the class described, means for successively guiding the gravity movements of a plurality of knob members to assembling position, separate means operable to respectively carry and move washer and nail members to assembling position, said separate means each including an endless member carrying element, and means operable to act on a nail member when in assembling position to feed it through aligned washer and knob members disposed in assembling position.

27. In a machine of the class described, a magazine for containing and successively guiding the gravity movements of a plurality of knob members to assembling position, an endless belt for carrying and successively moving washers to assembling position, means operable to successively move nails to assembling position, mechanism for imparting periodical predetermined feeding movements to the belt and nail feeding means to successively feed members carried thereby to assembling position, and means operable to act on a nail when in assembling position to thread it through washer and knob members disposed in assembling position.

28. In a machine of the class described, means for retaining a plurality of knob members in column form and guiding the feeding movements thereof to successively place them in assembling position, a washer feeding belt movable to successively place washers in assembling position, a nail feeding means movable to successively place nails in assembling position, mechanism for imparting simultaneous feeding movements to the washer feeding belt and nail feeding means, and means automatically operable to act on each nail when in assembling position to thread it through a registering washer and knob member disposed in assembling position.

29. In a machine of the class described, a gravity feed magazine having two vertical compartments for receiving separate insulating members of a nail knob in column form with the members in the different compartments aligned in pairs and with the pairs successively movable together to assembling position, means for periodically and successively feeding washers to assembling position, means for periodically and successively feeding nails to assembling position, and means operable to act on each nail when in assembling position to thread it through a washer and pair of insulating members disposed in assembling position.

30. In a machine of the class described, means for successively feeding insulating knob members to assembling position with different members axially aligned in pairs, endless chain means for carrying and periodically and successively feeding nails to assembling position, and means having a plunger operable to act on each nail when in assembling position to thread it through a pair of insulating members disposed in assembling position.

31. In a machine of the class described, means for successively guiding the movements of a plurality of pairs of insulating knob members to assembling position, endless chain means operable to carry and successively feed nails to assembling position, and means operable to act on each nail when in assembling position to thread it through a pair of knob members disposed in assembling position.

32. In a machine of the class described, means for successively guiding the movements of a plurality of pairs of insulating knob members to assembling position, endless chain means operable to carry and successively feed nails to assembling position, and means operable to act on each nail when in assembling position to thread it through a pair of knob members disposed in assembling position, and means operable after each threading operation to eject the assembled nail and knob members from assembling position.

33. In a machine of the class described, means forming a ram-way, means for successively guiding the gravity movements of knob members to assembling position in the way, means operable to successively and periodically place nails in assembling position, means operable to thread each nail when in assembling position through insulating members disposed in assembling position, and a ram operable in said way to eject the assembled nail and knob members from assembling position.

34. In a machine of the class described, means forming a ram-way, means for successively guiding the gravity movements of pairs of knob members to assembling position in the way, means for periodically and successively feeding nails to assembling position, means operable to act on each nail when in assembling position to thread it through a registering pair of knob members disposed in assembling position, and a ram movable in the way to discharge the assembled nail and knob members from assembling position.

35. In a machine of the class described, means forming a ram-way, means for successively guiding pairs of knob members to assembling position in the way, means for periodically and successively feeding nails to assembling position, means for acting on each nail when in assembling position to thread it through a pair of knob members disposed in assembling position, and means operable in the way to periodically eject an assembled knob unit from the way.

36. In a machine of the class described, means for successively guiding pairs of nail knob members to assembling position, means including a ram periodically operable to eject assembled nail knob units from assembling position, means periodically actuated by movements of said ram, to successively feed nails to assembling position, and means operable to act on each nail when in assembling position and thread it through a pair of knob members disposed in assembling position.

37. In a machine of the class described, means for successively guiding pairs of nail knob members to assembling position, mechanism including a ram and an endless nail feeding means operable to impart periodical movements to the ram to eject an assembled knob and periodical movements to the nail feeding means to successively position nails in assembling position, and means operable to act on a nail disposed in assembling position and thread it through knob members disposed in assembling position.

38. In a machine of the class described, means for successively guiding pairs of knob members to assembling position, mechanism including an ejecting ram, a washer feeding unit and a nail feeding unit operable to periodically move the cam to eject an assembled knob from assembling position and to impart intermittent feeding movements to the washer and nail feeding units to successively place washers and nails in assembling position, and means operable to act on a nail when in assembled position to thread it through a registering washer and pair of knob members disposed in assembling position.

39. In a machine of the class described, means for directing successive knob members to assembling position, a unitary mechanism including a washer feeding means and a nail feeding means operable to periodically move the two means to place successive washers and nails respectively carried thereby to assembling position, and means operable to act on a nail when in assembling position to thread it through a washer and knob member disposed in assembling position.

40. In a machine of the class described, a way having an inclined outer end portion, means for successively guiding pairs of nail knob members to assembling position in the way, an endless belt having pockets in its upper edge for carrying washers, the belt moving along one side of the way, means operable to periodically move the belt to successively place washers carried thereby in assembling position, means operable to periodically move successive nails to assembling position, means operable to act on a nail when in assembling position to thread it through a washer and knob member disposed in assembling position, and means operable to periodically eject an assembled knob unit from assembling position and to force it up the way incline to release the washer and nail members thereof from engagement with a pocket of the belt.

41. In a machine of the class described, means for successively guiding pairs of knob members to assembling position and having a lateral discharge way leading from the assembling point thereof and provided with an inclined portion, an endless belt movable along a side of the discharge way and having washer carrying pockets and registering nail receiving notches in the upper edge thereof, and mechanism operable to move the belt to successively feed washers carried thereby to assembling position, to successively feed nails to assembling position and to thread each nail when in such position through a registering washer and a pair of knob members disposed in assembling position, and then to eject an assembled knob unit from the knob member guiding means through the discharge way thereof and up the incline to raise a washer and nail of the unit from belt engaging position.

42. In a machine of the class described, a magazine for successively guiding the movement of pairs of knob members disposed therein to assembling position and having a discharge way leading from assembling position and having an inclined portion, mechanism including a washer feed belt traversing a side of the discharge way, a nail feeding means, and a ram and operable to periodically move the belt and nail feeding means to successively place washers and nails carried thereby in assembling relation, and means operable to thread a nail disposed in assembling position through a washer and knob members disposed in assembling position, said mechanism then operating to move the ram to eject an assembled knob unit from the magazine through the discharge way, the discharging unit being forced up the incline to disengage its knob and nail members from the belt.

43. In a machine of the class described, means for successively guiding the gravity feed of nail knob members to assembling position and forming a discharge way, a belt movable along a side of the discharge way and having washer carrying pockets in its upper edge, means for automatically supplying washers to successive pockets in the belt, and mechanism operable to periodically move the belt to successively feed washers to assembling position, to periodically and successively feed nails to assembling position, and means operable to act on a nail when in assembling position to thread it through a washer and the knob members disposed in assembling position, said mechanism then operating to eject an assembled knob unit from assembling position through the discharge way.

44. In a machine of the class described, means forming a discharge way and a guide for directing the gravity movements of successive pairs of knob members to assembling position in the way, a ram reciprocally movable in the way, a washer feed belt movable along one side of the way, nail feeding means, means for imparting periodical reciprocatory movements to the ram to discharge an assembled knob unit from assembling position in the way, means carried by the ram and operable by an ejecting movement thereof to impart a feeding movement to the belt to place a washer carried thereby in assembling position, means operable by an ejecting movement of the ram to move the nail feeding means to place a nail carried thereby in assembling position, and means operable to act on a nail when in assembling position to thread it through a washer and pair of knob members disposed in assembling position.

45. In a machine of the class described, a ram operable to eject assembled knob units, means for operating the ram to impart periodical ejecting movements thereto, a belt operable to carry knob unit members and to successively feed them to assembling position, and a catch member carried by the ram and operable to impart a predetermined feeding movement to the belt at each ejecting stroke of the ram and to disengage the belt during a return stroke of the ram.

46. In a machine of the class described, a pair of opposed burr-forming jaws operable to form burrs on nails fed therebetween, levers carrying said jaws and normally standing in position to retain the jaws open, and cam means periodically operable to simultaneously act on the levers to close the jaws and form burrs on nails fed therebetween.

47. In a machine of the class described, a pair of levers having a common fulcrum and provided with jaws for burring nails fed therebetween, the jaws normally standing in open position, a cam slide operable when moved in one direction to act on the levers to impart a positive closing movement to the jaws, and means operable to periodically impart jaw closing movements to the slide.

48. In a machine of the class described, a pair of opposed jaws for acting on members fed therebetween to form burrs thereon, means operable to impart closing movements to the jaws, and means yieldingly carried by the jaws and operable by a closing movement of the jaws to engage and center a member with respect to the jaws and hold it in centered position until acted on by the jaws.

49. In a machine of the class described, a pair of opposed jaws for acting on members fed therebetween to form burrs thereon, means automatically operable to periodically impart a closing movement to the jaws, yielding means carried by the jaws and normally projecting therefrom in advance of their working faces to engage and center a member with respect to the jaws before the jaws engage the member and to hold the members centered until acted on by the jaws.

50. In a machine of the class described, a pair of opposed jaw levers having a common fulcrum and adapted to form burrs on a nail member inserted therebetween, a spring finger secured to each lever and yieldingly projecting through the jaw and beyond its working face to cooperate with the finger of the other jaw to grip and center a nail with respect to the jaws during a closing movement of the jaws and to hold the nail centered until after being acted on by the jaws, and means operable to periodically act on the lever to impart closing movements to the jaws.

51. In a machine of the class described, means operable to periodically and successively feed knob assembling nails to assembling position, and means including a pair of jaw levers operable to periodically move the levers to grip and form burrs on a nail disposed in assembling position.

52. In a machine of the class described, a pair of normally open nail burr forming jaws, means for periodically and successively feeding nails to assembling position with an end thereof projecting between the jaws, and means periodically operable to close the jaws to upset a nail disposed therebetween.

53. In a machine of the class described, a pair of normally open nail burr forming jaws, means for periodically and successively feeding nails to assembling position with an end thereof projecting between the jaws, means periodically operable to close the jaws to upset a nail disposed therebetween, and means automatically operable to center a nail with respect to the jaws before being acted on thereby.

54. In a machine of the class described, means for successively guiding the movements of knob members to assembling position, means operable to periodically and successively feed nails to assembling position, means operable to act on the nail when in assembling position to thread it through a knob member disposed in assembling position, means automatically operable to act on a nail to form a burr thereon after being threaded through a knob member to retain the nail and member in assembled relation, and means carried by the burr forming means and operable to yieldingly engage and center a nail with respect to the burr forming means before being acted on by the burr forming means.

55. In a machine of the class described, means for successively directing the gravity feed of knob members to assembling position, means operable to successively feed washers to assembling position, means operable to sucessively feed nails to assembling position, means operable to act on a nail when in assembling position to thread it through a washer and knob members disposed in assembling position, and means operable to act on a nail to form a burr after being threaded through the members to retain the parts in assembled relation.

56. In a machine of the class described, means for guiding the movements of successive knob insulating members to assembling position, means operable to periodically feed successive washers to assembling position, means operable to act on a nail disposed in assembling position and feed it through a washer and a knob member disposed in assembling position, means automatically operable to engage and form burrs on opposite sides of a nail after being threaded through a washer and knob members to retain the parts in assembled relation, and means automatically operable to engage, hold and center a nail with respect to the burr forming means before being and until acted on by the burr forming means.

57. In a machine of the class described, means for guiding the movements of successive pairs of nail knob members to assembling position, mechanism operable to periodically feed successive washers and successive nails to assembling position, means operable to thread a nail when in assembling position through a washer and knob members disposed in assembling position, said mechanism then operating to eject an assembled knob unit from assembling position, and means automatically operable after the nail threading operation and before the ejecting of an assembled unit to act on the nail to have upsetting action thereon to prevent its withdrawal from the knob members.

58. In a machine of the class described, means for guiding the movements of successive pairs of nail knob members to assembling position, mechanism operable to periodically feed successive washers and successive nails to assembling position, means operable to thread a nail when in assembling position through a washer and knob members disposed in assembling position, said mechanism then operating to eject an assembled knob unit from assembling position, means automatically operable after the nail threading operation and before the ejecting of the assembled unit to act on the nail to have upsetting action on the nail to prevent its withdrawal from the knob members, and means operable to yieldingly grip and center a nail with respect to the upsetting means before the upsetting operation.

59. In a machine of the class described, means for guiding the movements of successive pairs of knob insulating members to assembling position, mechanism including a washer feeding belt and automatically operable to periodically move the belt to feed washers to assembling position, and to periodically feed nails to assembling position, means operable to thread each nail when in assembling position through a washer and knob members disposed in assembling position, said mechanism operating to periodically eject an assembled knob unit from assembling position, means for automatically supplying the belt pockets with washers, and means automatically operable to form opposing burrs on a nail to thread it in engagement with the knob members after the threading operation and before the ejecting of the assembled unit.

60. In a machine of the class described, means for guiding the movements of successive pairs of knob insulating members to assembling position, mechanism including a washer feeding belt and automatically operable to periodically move the belt to feed washers to assembling position, and to periodically feed nails to assembling position, means operable to thread each nail when in assembling position through a washer and knob members disposed in assembling position, said mechanism operating to periodically eject an assembled knob unit from assembling position, means for automatically supplying the belt pockets with washers, means automatically operable to form opposing burrs on a nail to thread it in engagement with the knob members after the threading operation and before the ejecting of the assembled unit, and means automatically operable to center a nail with respect to the burr forming means before being acted on thereby.

In testimony whereof I have hereunto signed my name to this specification.

TIMOTHY HENRY HANLEY.